(12) United States Patent
Li et al.

(10) Patent No.: US 9,747,195 B2
(45) Date of Patent: Aug. 29, 2017

(54) SYSTEM AND METHOD FOR COVERAGE-BASED AUTOMATED TEST CASE AUGMENTATION FOR DESIGN MODELS

(71) Applicant: General Electric Company, Schenectady, NY (US)

(72) Inventors: Meng Li, Niskayuna, NY (US); Michael Richard Durling, Niskayuna, NY (US); Jian Dai, Niskayuna, NY (US); Scott Alan Stacey, Dayton, OH (US)

(73) Assignee: General Electric Company, Niskayuna, NY (US)

( * ) Notice: Subject to any disclaimer, the term of this patent is extended or adjusted under 35 U.S.C. 154(b) by 64 days.

(21) Appl. No.: 15/013,391

(22) Filed: Feb. 2, 2016

(65) Prior Publication Data

US 2017/0220456 A1    Aug. 3, 2017

(51) Int. Cl.
G06F 9/44    (2006.01)
G06F 11/36    (2006.01)

(52) U.S. Cl.
CPC ............... *G06F 11/3684* (2013.01)

(58) Field of Classification Search
CPC ............ G06F 11/3684; G06F 11/3676; G06F 11/3688
USPC .......................................... 717/124
See application file for complete search history.

(56) References Cited

U.S. PATENT DOCUMENTS

| 5,913,023 A | 6/1999 | Szermer |
| 5,918,037 A | 6/1999 | Tremblay et al. |
| 6,125,359 A * | 9/2000 | Lautzenheiser ..... G06F 11/3676 706/60 |

(Continued)

FOREIGN PATENT DOCUMENTS

CN        102323906 A    1/2012

OTHER PUBLICATIONS

Benjamin et al. "A Study in Coverage-Driven Test Generation", ACM 1999.*

(Continued)

*Primary Examiner* — Wei Zhen
*Assistant Examiner* — Junchun Wu
(74) *Attorney, Agent, or Firm* — Nitin N. Joshi (57) ABSTRACT

A method for automated test case augmentation includes receiving, at an automated test augmentation system, a design model and model coverage gap information from a model-based development tool, translating the model coverage gap information into machine-readable mathematical test objective expressions, developing a set of test objective operators by translating the machine-readable mathematical test objective expressions, localizing target operators for the identified coverage gaps within the design model, attaching the test objective operators to target operators of the design model to create a test model, augmenting the test model by propagating test objectives at the target operators to a test node operator of the design model, and executing, by a test generator, the augmented test model to obtain the test cases to cover the coverage gaps and the causes for the model coverage gaps. A system for implementing the model-based design and a non-transitory computer readable medium are also disclosed.

19 Claims, 5 Drawing Sheets

(56) References Cited

U.S. PATENT DOCUMENTS

| | | | |
|---|---|---|---|
| 6,978,401 B2* | 12/2005 | Avvari | G06F 11/3676 717/124 |
| 7,272,752 B2 | 9/2007 | Farchi et al. | |
| 8,234,105 B1* | 7/2012 | Aldrich | G06F 8/10 717/127 |
| 8,307,342 B2 | 11/2012 | Oglesby et al. | |
| 8,527,813 B2 | 9/2013 | Budnik et al. | |
| 8,612,938 B2 | 12/2013 | Prasad et al. | |
| 8,645,924 B2 | 2/2014 | Li et al. | |
| 8,683,442 B2* | 3/2014 | Peranandam | G06F 11/3684 717/124 |
| 8,924,923 B2 | 12/2014 | Son et al. | |
| 9,411,710 B2* | 8/2016 | Kumar | G06F 11/3676 |
| 9,423,407 B2* | 8/2016 | Le | G01N 35/00 |
| 2006/0010429 A1 | 1/2006 | Ihara | |
| 2009/0319830 A1 | 12/2009 | Zander-Nowicka et al. | |
| 2011/0066420 A1* | 3/2011 | Bassin | G06F 11/3676 703/22 |
| 2011/0083121 A1 | 4/2011 | Dixit et al. | |
| 2013/0097586 A1* | 4/2013 | Chandra | G06F 11/3684 717/124 |
| 2014/0130006 A1 | 5/2014 | Son et al. | |
| 2015/0301926 A1* | 10/2015 | Giannelos | G06F 11/3676 717/125 |
| 2016/0034382 A1* | 2/2016 | Kumar | G06F 11/3676 717/124 |
| 2016/0085665 A1* | 3/2016 | Junker | G06F 11/3684 714/38.1 |
| 2016/0170864 A1* | 6/2016 | Li | G06F 11/3684 717/126 |
| 2017/0039039 A1* | 2/2017 | Johnson | G06F 8/35 |

OTHER PUBLICATIONS

Automating selection of regression test cases based on domain independent specificiation changes, IP.com May 31, 2012.*
Das et al. "Formal Verification Coverage: Computing the Coverage Gap between Temporal Specifications", IEEE 2004.*
Wakankar, A. et al., "Automatic Test Case Generation in Model Based Software Design to Achieve Higher Reliability", 2nd International Conference on Reliability, Safety & Hazard (ICRESH-2010), 2010, (pp. 493-499, 7 total pages).

* cited by examiner

SYSTEM AND METHOD FOR COVERAGE-BASED AUTOMATED TEST CASE AUGMENTATION FOR DESIGN MODELS

BACKGROUND

Available model-based development tools can show unreachability of certain model elements. Some tools can generate test inputs that satisfy standard coverage objectives as well as user-defined test objectives and requirements. These test inputs can also be combined with tests defined using measured data so that simulations are testing against model coverage, requirements, and real-world scenarios.

However, some important coverage criteria (e.g., mask modified condition/decision coverage (MC/DC)) are not supported by available model-based development tools and redundant test cases are generated to satisfy certain coverage criteria. Further, some conventional development tools do not provide the capability of augmenting test cases to satisfy coverage criteria.

Software certification standards (e.g., DO-178C) require safety-critical software, such as aviation software, to be tested with strict test coverage (including MC/DC). These standards can require that each condition that could independently affect the decision be tested. Manual inspection of the model/code to identify the inputs sequences that drive an internal variable to a particular value is hard and time-consuming, especially when the aviation software system is large and complex.

DESCRIPTION

In accordance with embodiments, systems and methods provide support to the development of safety-critical software in a model-based development environment. Model test coverage gaps can be identified by model coverage analysis tools of the model-based development environment after the high-level requirements-based test cases are executed against the design model. The coverage gaps indicate the test criteria that have not been exercised by the high-level requirements-based test cases. Embodying systems and methods can automatically augment the test cases to cover the coverage gaps. Embodying systems and methods translate coverage gap information to machine-readable mathematical test objectives so that coverage gap information can be attached to a design model for automated test case augmentation, where the design model(s) is written in model-based development languages.

Embodying systems and methods employ a test generator, which can perform model-checking, constraint solving, and/or reachability resolution technologies on the design model(s) with test objectives attached, to automatically identify and fill test coverage gaps for the design model(s) of the safety-critical software. Additionally, embodying systems and methods can also identify model deficiencies—such as dead code, unintended functions, deactivated functions, etc. Embodying systems and methods can implement a coverage gap conversion rule that can convert the coverage gaps to test objectives. If an input sequence can activate the test objective, the input sequence can fill the coverage gap. The test objectives along with the design model are analyzed in test generators to generate test cases. Several coverage gap patterns are identified and their conversion rules are defined. Model test coverage gaps for design models developed in various conventional model-based development tools can be filled.

Safety-critical software, such as aviation software, are required by software certification standards (e.g. DO-178C) to be tested with strict test coverage, such as Modified Condition/Decision Coverage (MC/DC) which requires each condition to independently affect the decision. Manual inspection of the model/code to identify the inputs sequences that drive an internal variable to a particular value is hard and time-consuming, especially when the aviation software size is large and the complexity is growing.

Different coverage criteria are supported (e.g., Statement Coverage, Decision Coverage, MC/DC, masking MC/DC, State Coverage, Transition Coverage, etc.) with one or more conversion rules being implemented to accommodate the translation of the different criteria from coverage gap information to machine-readable mathematical test objectives. Embodying systems and methods can recognize the criteria, locate target design/code, perform test objective translation and attachment, propagate test objectives through the design architecture, and generate test cases based on the test objectives.

Figure 1:
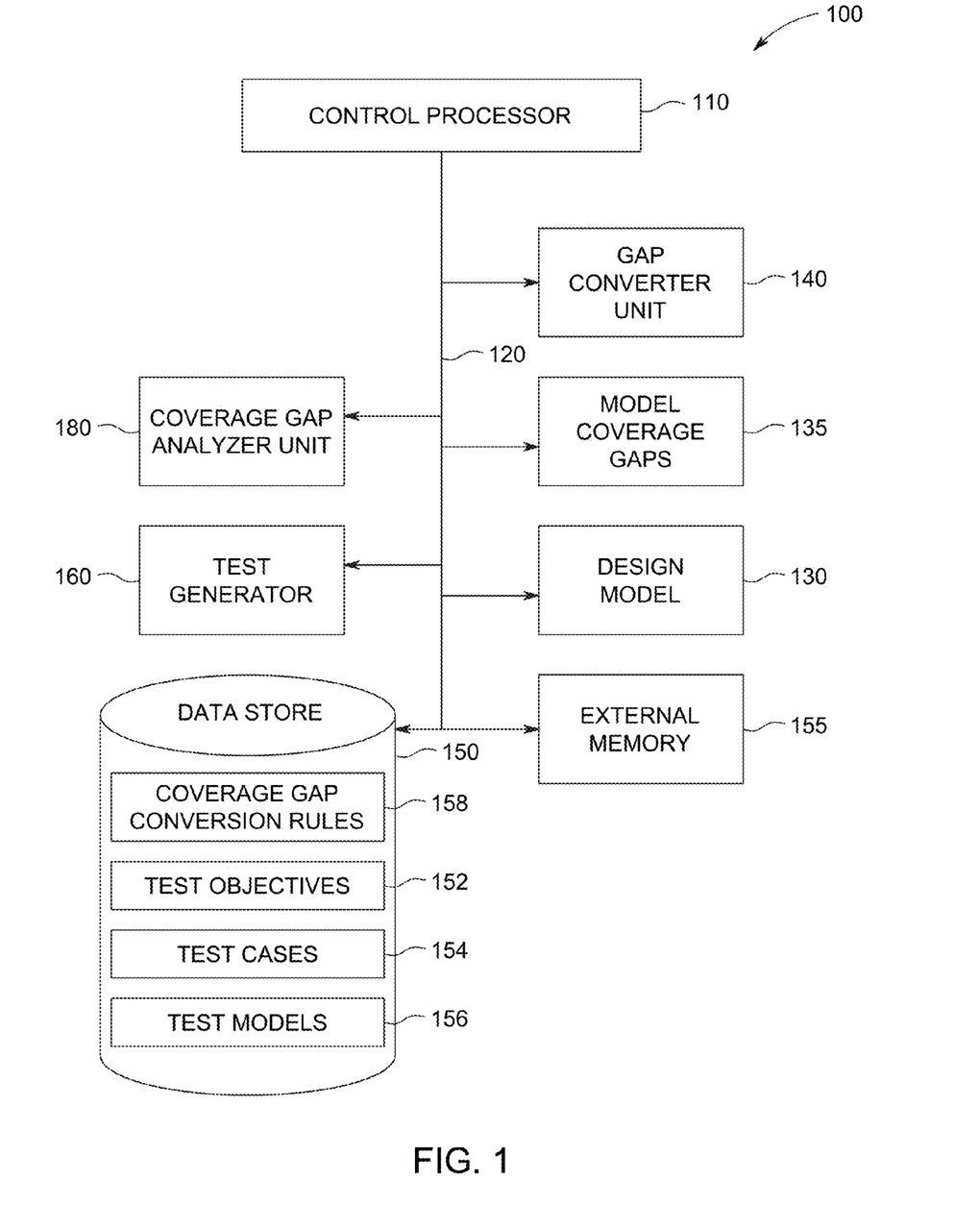
FIG. 1 depicts automated test case augmentation system in accordance with embodiments.

FIG. 1 depicts automated test case augmentation system 100 for design model in accordance with embodiments. System 100 includes control processor 110 which executes computer instructions to control the operation of the system and its components. Control processor 110 can be located in a computer, or a server, and interconnected to the various components via communication link 120. The communication link can be an internal bus, an electronic communication network, or the like.

System 100 can generate augmented test cases to satisfy model coverage based on received design model 130 of the safety-critical software, along with received model coverage gaps 135. The design models can be written in conventional, model-based development languages, such as Simulink/Stateflow, SCADE, etc.

Gap converter unit 140 is structured to convert the model coverage gaps to test objectives 152 based on coverage gap conversion rules 158, which can be stored in data store 150. The test objectives define and/or set the goals for test generator unit 160. The test objectives are then attached to the corresponding operators in the design model to create test model 156. The test generator applies the test model as input from which it develops a set of test cases 154, which achieve the test objectives.

Figure 2:
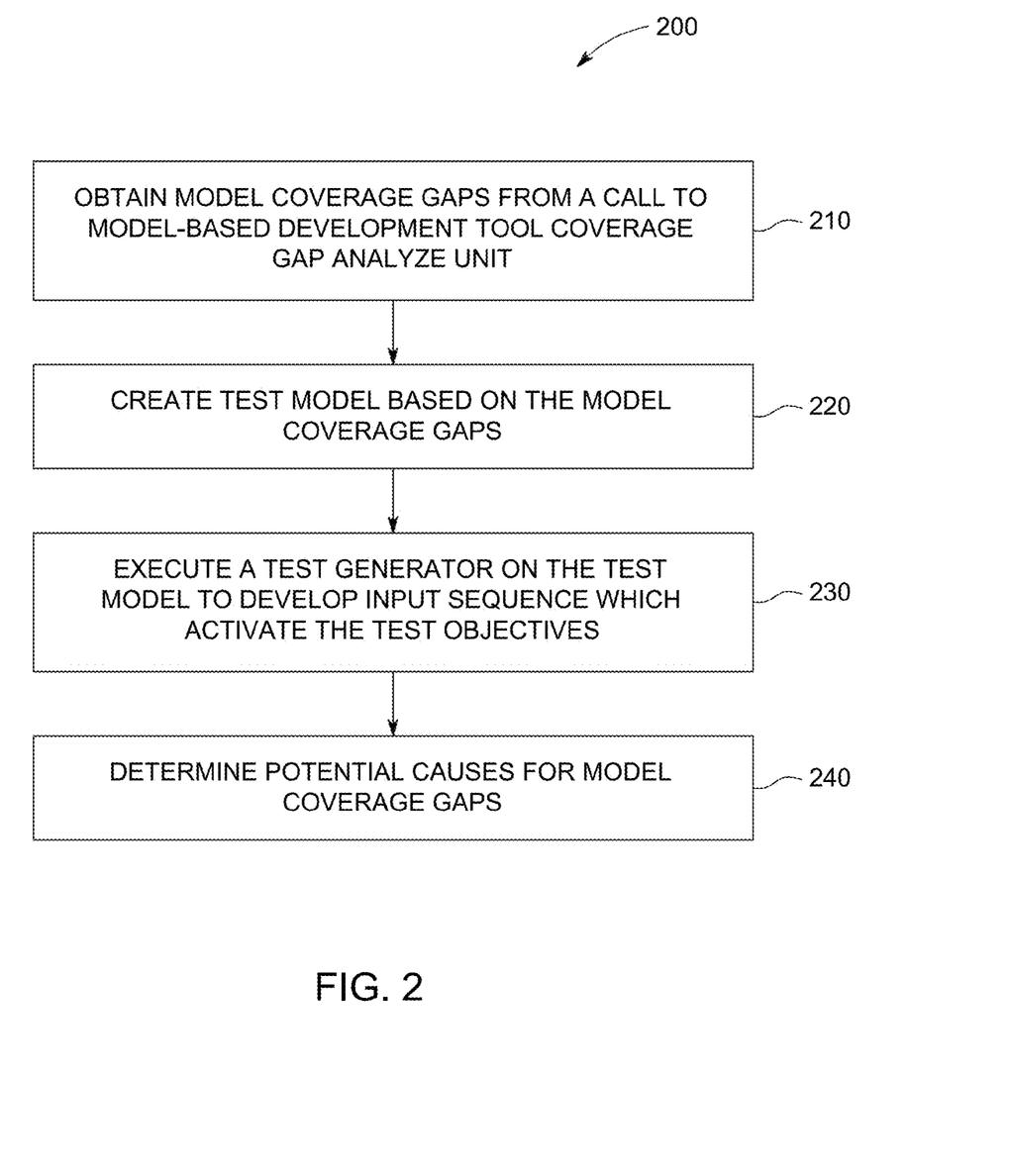
FIG. 2 depicts a process flowchart for automated design model test case augmentation in accordance with embodiments.

FIG. 2 depicts process 200 for automated design model test case augmentation in accordance with embodiments. Model coverage gaps can be obtained, step 210, from a call to a model coverage gap analyzer unit 180 of the model-based development tool. A test model is created, step 220, based on design model 130 and model coverage gaps 135. A test generator is executed, step 230, on the test model driving the inputs to cover the model coverage gaps. Based on the results of test generator execution, the potential causes of the model coverage gaps are determined, step 240.

Figure 3:
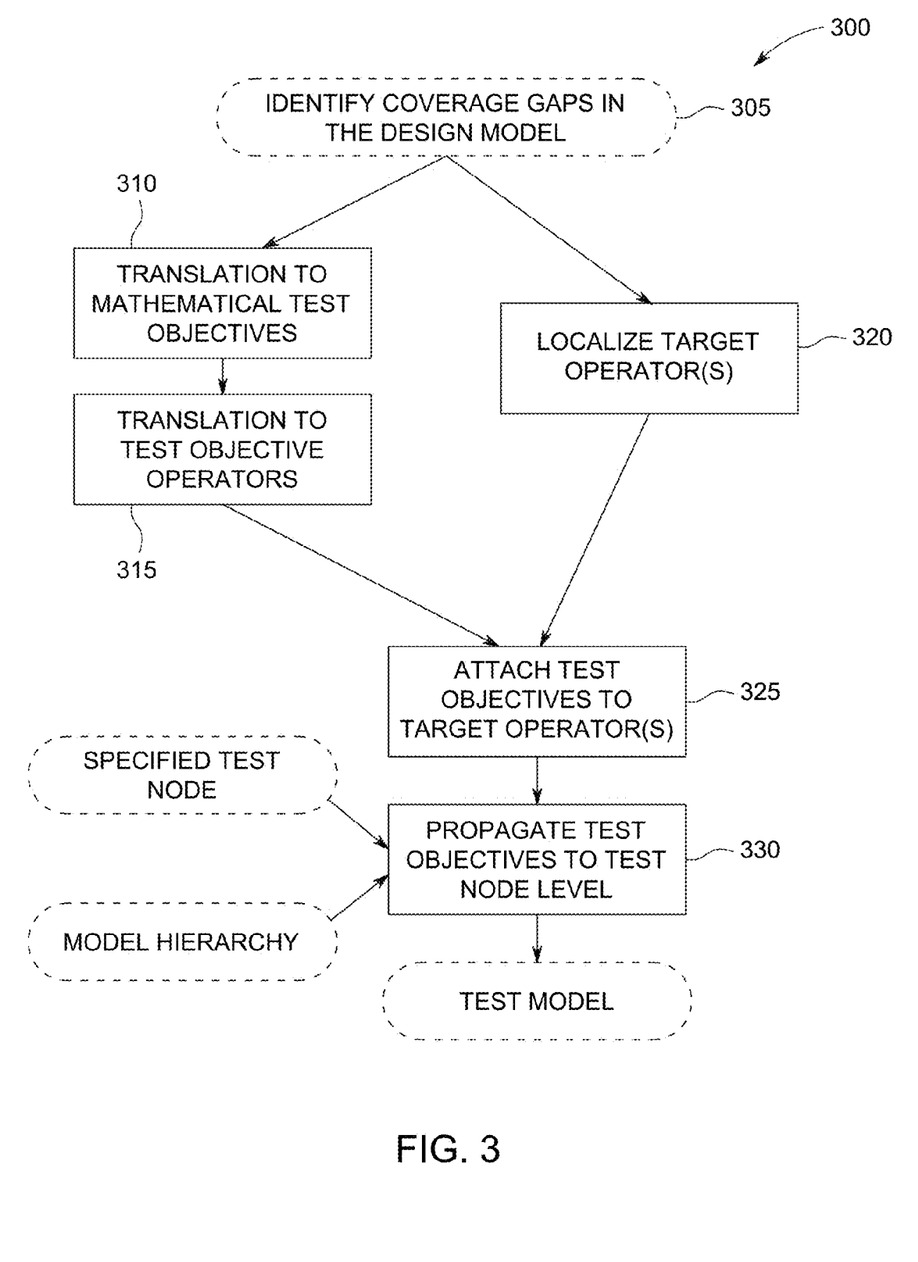
FIG. 3 depicts a process flowchart for test model creation based on model coverage gaps in accordance with embodiments.

FIG. 3 depicts process 300 for test model creation based on model coverage gaps (FIG. 2, step 220) in accordance with embodiments. The test models are created based on design model 130 and model coverage gaps 135. Coverage gap analyzer unit 180 identifies, step 305, coverage gaps in the design model. The coverage gaps are categorized and based on the categorization translated, step 310, into machine-readable, mathematical, test objective expressions. In accordance with implementations, the conversion can be achieved using a criteria conversion table, which are pre-created for each type of coverage criteria. Table I is an example of conversions from coverage gaps to test objective expressions in accordance with embodiments.

TABLE I

| Missing Coverage | Operator | Criteria | Test Objective Expression |
|---|---|---|---|
| 1 | Pwlinear::Counter/$ifthenelse1 | True | IF#1 condition=true |
| 2 | RollCommandValidity:: RollCommandValidity/$ifthenelse10 | False | IF#10 condition=false |
| 3 | RollCommandValidity:: RollCommandValidity/$ifthenelse8 | True | IF#8 condition=true |
| 4 | RollCommandValidity:: RollCommandValidity/IfBlock1: else:else:else: | Activated | Reachability(If Block1:ELSE:E LSE:ELSE)= true |

Criteria conversion table categorizes coverage criteria patterns and define test objectives for each of the criteria patterns. The coverage criteria conversion can support different coverage criteria, such as Statement Coverage, Decision Coverage, Modified Condition/Decision Coverage (MC/DC), masking MC/DC, State Coverage, Transition Coverage, etc.

The translated mathematical test objective expressions are then translated, step 315, into a set of test objective operators which can be attached to the design model.

The test objective operator(s) are attached to target operator(s) in the design model. The target operator(s) are localized, step 320, based on the identified coverage gaps within the design model. In accordance with implementations, to achieve localization the coverage gap information can be parsed to obtain the coverage gap target operator. The coverage gap information can include where the gap occurs, and what criteria is not satisfied.

Further, the test objective operators are attached, step 325, to connect the test objective corresponding signals in the target operator(s) to create the test model. The test objectives are also propagated, step 330, all the way to a test node operator which may be at a higher level in the model hierarchy, so that the test objective can be visible at the test node operator level. The test generator recognizes the test objectives of the test model and finds input sequences at the test node operator level to activate the test objective and cover the corresponding model coverage gaps.

Embodying systems and processes can determine the potential causes of the coverage gaps based on the test generator results. Determination can be made for the following conditions along with some design information:

1) If a test objective is identified as reachable (i.e., an input sequence can be found to activate the test objective) and the source of the corresponding coverage gap does not trace back to a high level requirement or derived requirement, then the corresponding coverage gap is caused by insufficient high level or derived requirements;

2) If a test objective is reachable and it traces to a high level requirement, then the corresponding coverage is missing because of the inadequate high level requirements-based tests;

3) If a test objective is reachable and it traces to a derived requirement specified by the software designer, then the corresponding coverage is missing because of the derived requirements.

4) If a test objective is unreachable (i.e., mathematically proven that no possible input sequences can be found to activate the test objective), then the test generator can execute again by including design model parameters as inputs to the design model. In this case, test generator can generate updated design model parameters that include changes to close the coverage gap associated with the input design model parameter.

4a) If a test objective is still identified as unreachable, then the coverage gap is unintended functions or dead code;

4b) If the coverage gap is identified as reachable, then the coverage gap is a deactivated function. Design model parameter values can be generated that make the coverage gap reachable.

Figure 4:
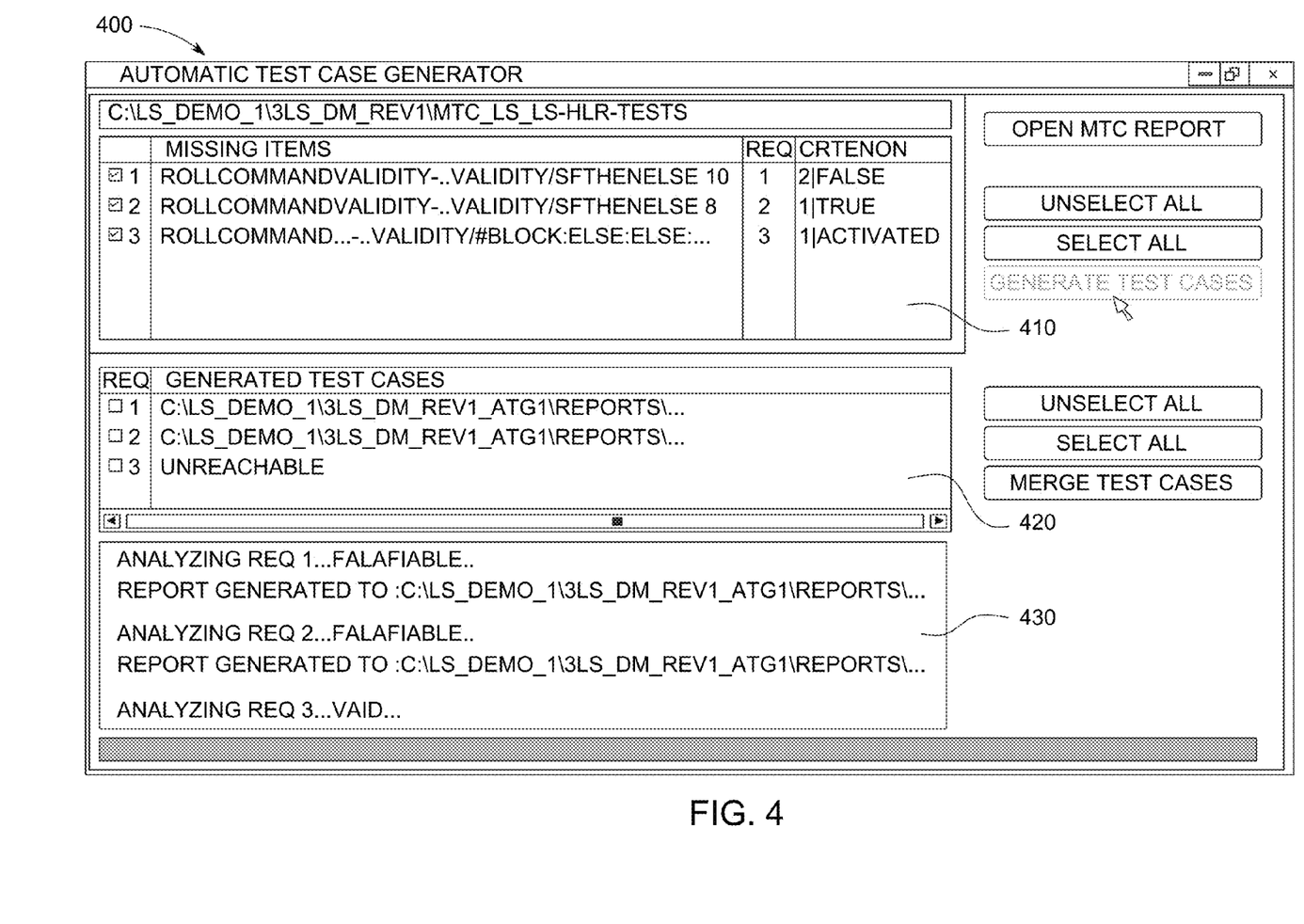
FIG. 4 depicts a user interface for the system of FIG. 1 in accordance with embodiments.

FIG. 4 depicts user interface 400 of system 100 in accordance with embodiments. The user interface can be an interactive graphical interface with multiple panes. Users can select the report including model coverage gaps by clicking "OPEN MTC REPORT" button. Missing items pane 410 displays a listing of design model coverage gaps in the selected report. Users can select a subset of coverage gaps to generate test cases. Test case pane 420 displays the generated test cases as the result of system 100 to cover the selected coverage gaps in pane 410. If the corresponding coverage gap is reachable, then the directory of the generated test case is displayed. If the corresponding coverage gap is unreachable, then "UNREACHABLE" is displayed. Status pane 430 displays status reports from system 100 as it performs its automated design model test case augmentation process.

Embodying systems and methods receive coverage gap analyzer unit reports from model-based development tools and convert identified model test coverage gaps in the report to machine-readable test objective expressions. These test objective expressions are then automatically converted into test objective operators which are attached to appropriate places in the design model itself to create a test model. A test generator is applied on the test model to generate test cases to cover the coverage gaps and identify design deficiencies.

Figure 5:
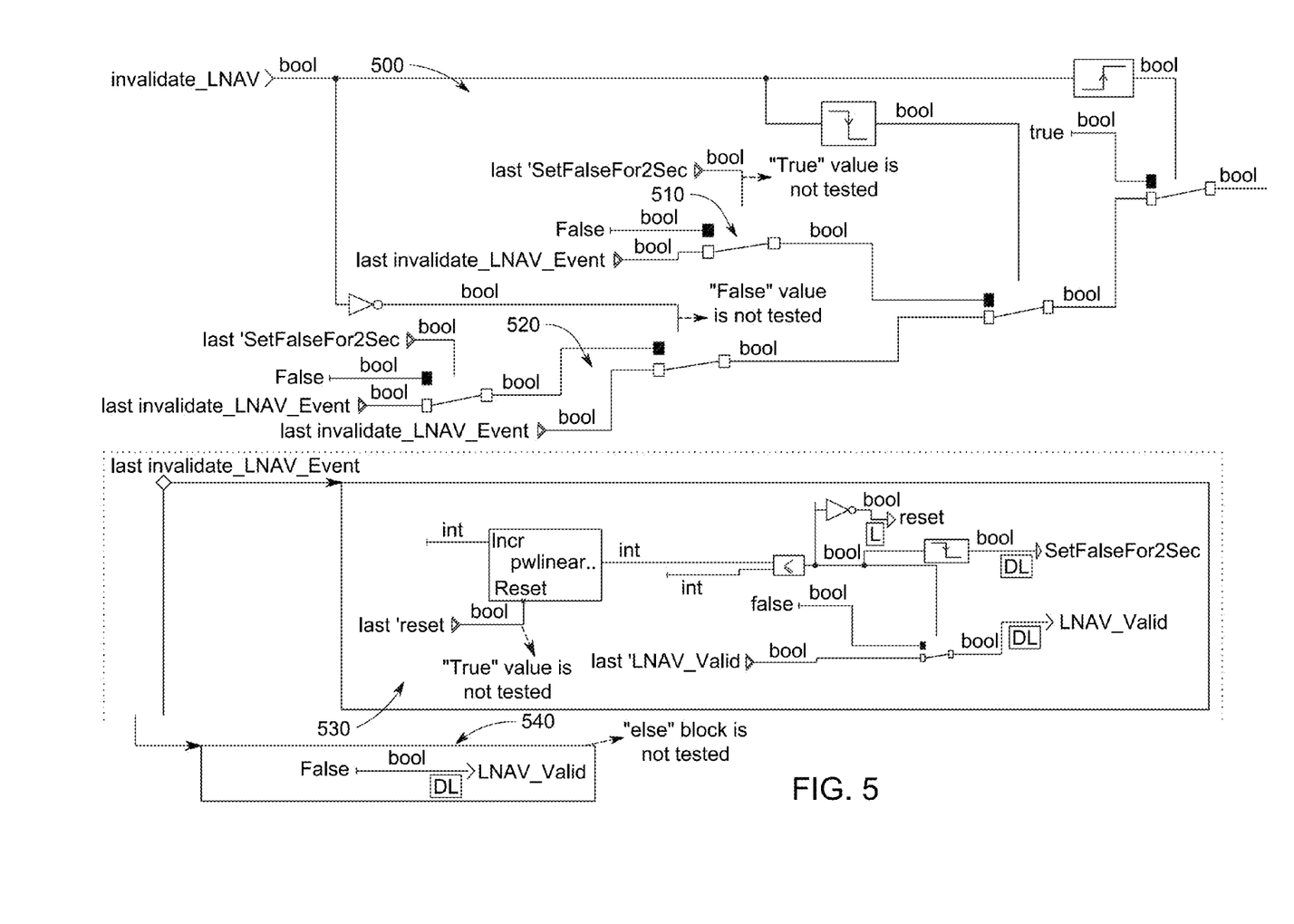
FIG. 5 depicts a design model and coverage analysis report in accordance with embodiments.

FIG. 5 depicts an example of design model and coverage analysis report 500 in accordance with embodiments. Included in the analysis report is a logic flow diagram of the design model. The logic flow diagram is annotated by automated test case augmentation system 100 to indicate test coverage gap locations 510, 520, 530 where true, or false, values were not tested for the indicated logic flow. The analysis report is also annotated as a result of the test case augmentation system operation to indicate that conditional branches of the logic flow were not tested—for example, "else" block 540 is indicated as not tested. In accordance with embodiments, a coverage analysis report can be in tabular form as shown in Table II:

TABLE II

| Missing Coverage | Operator | Criteria |
|---|---|---|
| 1 | Pwlinear::Counter/$ifthenelse1 | True |
| 2 | RollCommandValidity::RollCommandValidity/$ifthenelse10 | False |
| 3 | RollCommandValidity::RollCommandValidity/$ifthenelse8 | True |
| 4 | RollCommandValidity::RollCommandValidity/IfBlock1:else:else:else: | Activated |

In accordance with embodiments, in masking MC/DC rules can be followed when the criterion is a path starting from an operator and ending at an operator through a sequence of operators. For example, local variables can connect paths from the end of one path to the beginning of another path; and an output variable can connect paths from the end of one path to the beginning of another path by using a textual expression. In accordance with embodiments, test generator 160 can receive a trap condition (negation of test objective) and attempt to find a counterexample for the trap condition. If a counterexample is found, the counterexample is the test case that satisfies the test objective. If no counterexample is found, the test objective is unreachable meaning no test cases can cover the corresponding coverage gap. In such an instance, the coverage criteria can be converted into test objective expressions, which are translated into trap condition blocks attached in the model.

In accordance with some embodiments, a computer program application stored in non-volatile memory, computer-readable medium (e.g., register memory, processor cache, RAM, ROM, hard drive, flash memory, CD ROM, magnetic media, etc.), and/or external memory 155 may include code or executable instructions that when executed may instruct and/or cause a controller or processor to perform methods discussed herein such as a method for the development of safety-critical software in a model-based development environment, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method for automated test case augmentation, the method comprising:
receiving, at an automated test augmentation system, a design model and model coverage gap information from a model-based development tool, the model coverage gap information indicating test criteria not exercised by a high-level requirements-based test case;
translating the model coverage gap information into machine-readable mathematical test objective expressions;
developing a set of test objective operators by translating the machine-readable mathematical test objective expressions;
localizing target operators for the identified coverage gaps within the design model;
attaching the test objective operators to target operators of the design model to create a test model;
augmenting the test model by propagating test objectives at the target operators to a test node operator of the design model; and
executing, by a test generator, the augmented test model to obtain the test cases to cover the coverage gaps and the causes for the model coverage gaps.

2. The method of claim 1, the coverage criteria translation including using a criteria conversion table.

3. The method of claim 2, including obtaining from the model-based development tool the criteria conversion table.

4. The method of claim 1, including at least one of categorizing and identifying the coverage criteria.

5. The method of claim 4, including generating one or more conversion rules for the coverage criteria.

6. The method of claim 1, including generating updated design model parameters that make an associated coverage gap reachable by test cases.

7. A non-transitory computer readable medium having stored thereon instructions which when executed by a control processor cause the control processor to perform a method for automated test case augmentation, the method comprising:
receiving, at an automated test augmentation system, a design model and model coverage gap information from a model-based development tool, the model coverage gap information indicating test criteria not exercised by a high-level requirements-based test case;
translating the coverage gaps into machine-readable mathematical test objective expressions;
developing a set of test objective operators by translating the machine-readable mathematical test objective expressions;
localizing target operators for the identified coverage gaps within the design model;
attaching the test objective operators to target operators of the design model to create a test model;
augmenting the test model by propagating test objectives at the target operators to a test node operator of the design model; and
a test generator executing the augmented test model to obtain the test cases to cover the coverage gaps and the causes for the model coverage gaps.

8. The non-transitory computer-readable medium of claim 7, the instructions further causing the control processor to perform the coverage criteria translation by including using a criteria conversion table.

9. The non-transitory computer-readable medium of claim 8, the instructions further causing the control processor to obtain from the model-based development tool the criteria conversion table.

10. The non-transitory computer-readable medium of claim 7, the instructions further causing the control processor to at least one of categorize and identify the coverage criteria.

11. The non-transitory computer-readable medium of claim 10, the instructions further causing the control processor to generate one or more conversion rules for the coverage criteria.

12. A system for automated test case augmentation, the system comprising:
   a computer including a control processor, the control processor configured to execute program instruction;
   the automated test case augmentation system configured to receive a design model and model coverage gaps from a model-based development tool, the model coverage gaps indicating test criteria not exercised by a high-level requirements-based test case;
   a gap converter unit linked to the control processor, the gap converter unit configured to convert one or more of the model coverage gaps of the design model to machine-readable mathematical test objective expressions;
   a test generator unit linked to the control processor, the test generator unit configured to develop a set of test cases from the test objectives within a test model;
   the gap converter unit further configured to translate the machine-readable mathematical test objective expressions to test objective operators;
   the gap converter unit configured to create a test model by attaching the test objective operators to corresponding operators in the design model;
   the control processor configured to augment the test model by propagating test objectives at the target operators to a test node operator of the design model; and
   the control processor configured to execute the test generator on the augmented test model to obtain the test cases to cover the coverage gaps and the causes for the model coverage gaps.

13. The system of claim 12, configured to receive the model coverage gaps from a model-based development tool.

14. The system of claim 12, the test objectives defining one or more testing goals.

15. The system of claim 12, the test objective operators being test objective operators that can be attached to the design model.

16. The system of claim 12, including a data store for storing test objectives, test models, and coverage gap conversion rules.

17. The system of claim 12, the control processor further configured to execute program instructions that cause the control processor to translate coverage criteria translation by using a criteria conversion table.

18. The system of claim 17, the control processor further configured to execute program instructions that cause the control processor to obtain from the model-based development tool the criteria conversion table.

19. The system of claim 12, the control processor further configured to execute program instructions that cause the control processor to:
   at least one of categorize and identify the coverage criteria; and
   generate one or more conversion rules for the coverage criteria.

* * * * *